(No Model.)
J. W. FOWLER.
BRAKE HANDLE.
No. 396,924. Patented Jan. 29, 1889.
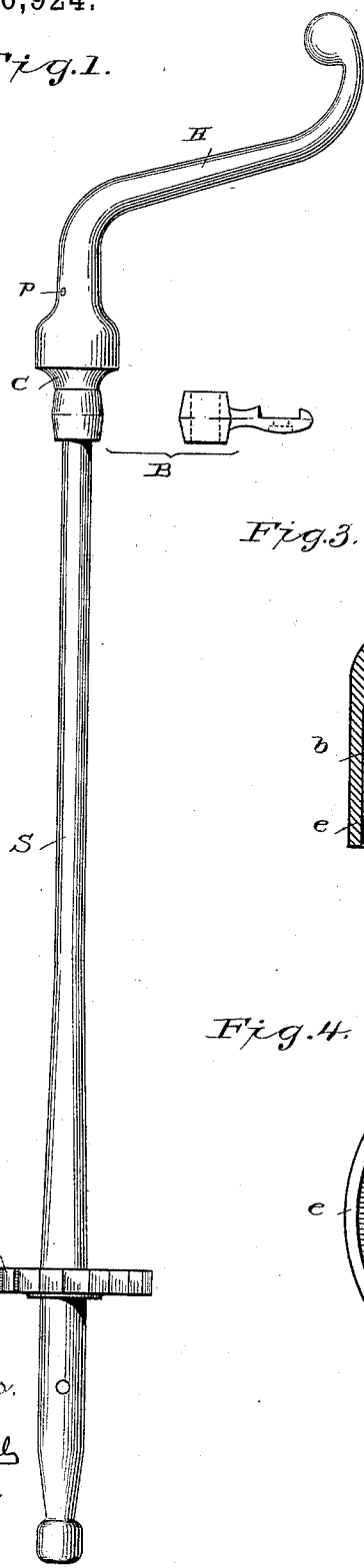
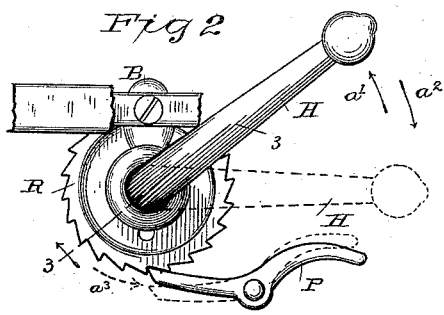
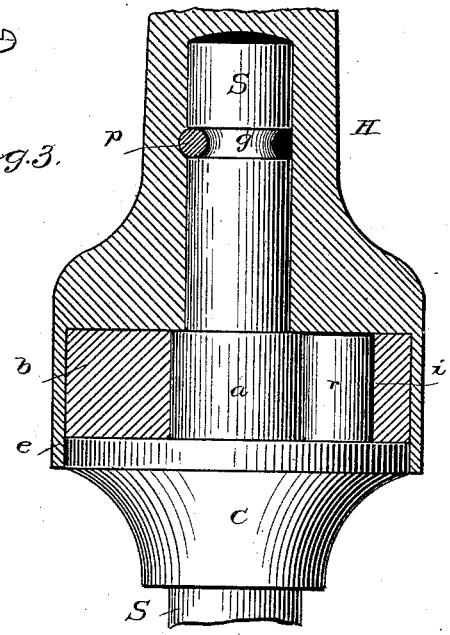
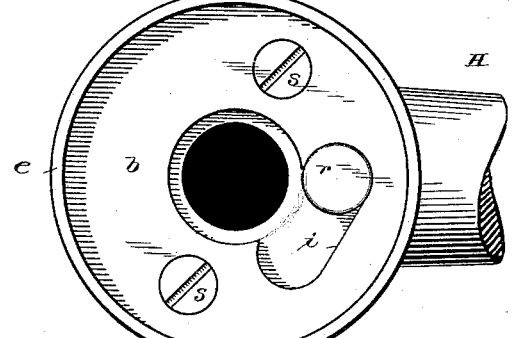
Witnesses,
H. H. Laul
Lort Phillips.
Inventor.
JOHN W. FOWLER,
By
Attorney.

UNITED STATES PATENT OFFICE.

JOHN W. FOWLER, OF BROOKLYN, NEW YORK.

BRAKE-HANDLE.

SPECIFICATION forming part of Letters Patent No. 396,924, dated January 29, 1889.

Application filed October 19, 1888. Serial No. 288,582. (No model.)

*To all whom it may concern:*

Be it known that I, JOHN W. FOWLER, a citizen of the United States, residing at Brooklyn, in the State of New York, have invented a new and useful Improvement in Brake-Handles, of which the following is a specification.

This invention relates to means for connecting brake-handles with vertical brake-spindles on street-cars and other railway-cars having spring-retracted brakes that are applied by hand.

The present invention consists in certain novel combinations of parts, hereinafter set forth and claimed, comprising as a whole a peculiarly-constructed brake-handle and springless and durable means whereby it is so connected with the brake-spindle as to be moved independently of the latter and of the brakes to the most convenient or advantageous angle or position, and there automatically clutched fast for turning the brake-spindle to apply the brakes at one or more operations, and which renders the unlocked brake-spindle free to turn independently of the handles, so that the brakes may be instantaneously retracted, and blows from crank-shaped handles are prevented.

A sheet of drawings accompanies this specification as part thereof.

Figure 1 of the drawings is an elevation of a brake-spindle and its appurtenances, including a handle constructed and connected with the spindle proper according to this invention. Fig. 2 is a top view of the same, illustrating the operation of the handle. Fig. 3 represents a vertical section on the line 3 3, Fig. 2, showing the upper end of the brake-spindle in elevation; and Fig. 4 is a bottom view of the handle detached.

Like letters refer to like parts in the several figures.

The brake-spindle S is vertical, as is customary, and is provided near its lower end with the customary ratchet-wheel, R, fast thereon and engaged by a detent-pawl, P, Fig. 2, and may have any ordinary bearing or bearings and ordinary connections with the spring-retracted brakes below this. Near its upper end a circular collar, C, is shrunk upon the spindle above its upper steadying-bearing, B, and, together with those portions of the spindle above the collar, is lathe-finished. The upper end of the iron or steel spindle is also preferably hardened. The lower portion of the handle H is axially drilled and concentrically recessed to fit over said upper portions of the spindle S, together with a bushing, $b$, of hardened steel, which is fastened therein by a pair of screws, $s$, Fig. 4. The bushing $b$ is in turn recessed to inclose and coact with a hardened-steel roller, $r$, which is thus interposed between the body of the bushing and the periphery of that portion, $a$, of the spindle S immediately above said collar C, while the strain is sustained by the bushing as a whole, encircling the spindle, as indicated in Fig. 4. The handle may consequently be of brass, if preferred. The lower end of the roller $r$, exposed to view in Fig. 4, is flat, and rests upon a smooth horizontal surface on the collar C, as shown in Fig. 3. The greatest tendency of the roller consequently is to stand with the collar when the latter is stationary. This insures the clutching operation at the beginning of each movement of the handle in the proper direction to apply the brakes, as the bushing $b$, turning with the handle H, wedges the stationary roller into biting contact with the spindle at the very start. It also in like manner insures the unclutching operation when the handle is turned in the reverse direction, moving the bushing relatively to the stationary roller, and thus freeing the latter. After each effective movement of the handle it should be turned backward to unclutch it from the spindle. A movement of an inch or so will suffice when this is the only object. After the handle is so released the detent-pawl may be kicked out of mesh with the ratchet-wheel, as represented in dotted lines at P in Fig. 2, and the succeeding instantaneous rotation of the spindle by the brake-springs is not transmitted to the handle, because the inertia of the loose roller now tends to keep it stationary with the handle in the position of rest in which the roller is shown in Fig. 4. The lower edge, $e$, of the handle-socket closely embraces the perimeter of the collar C, as shown in Fig. 3, and excludes dust.

The longitudinal separation of the handle from the spindle is prevented by suitable means, as a groove, $g$, around the upper end of the spindle, coinciding with a tangential hole in the handle, which admits a pin, $p$, Figs. 1 and 3. The handle is thus secured in place without interfering with turning it independently of the spindle, as aforesaid, or with said independent rotation of the spindle. Said independent movement of the handle H into effective position is represented by the arrow $a'$ in Fig. 2. Its effective movement, which turns the spindle S and applies the brakes, is represented by the arrow $a^2$ and dotted lines at H in the same figure, and the rotation of the spindle S independently of the handle is represented by the arrow $a^3$ and said dotted lines at P in the same figure.

I claim as my invention and desire to patent under this specification—

1. In combination with a vertical brake-spindle carrying a collar near its upper end, and having a smooth cylindrical portion immediately above said collar, a handle inclosing a clutch-roller in contact with said cylindrical portion of the spindle and which rests endwise upon said collar, and means, substantially as hereinbefore specified, for wedging the roller against the spindle when the handle is turned in a given direction, whereby the handle is adapted to be moved independently of the spindle to an effective position and the unlocked spindle is rendered free to turn independently of the handle to instantaneously release the brakes.

2. In combination with a brake-spindle having at or near its upper end a cylindrical portion, a recessed handle provided with a bored and recessed bushing which encircles said spindle portion, and a clutch-roller confined between an incline in said bushing-recess and the periphery of said spindle portion, substantially as hereinbefore specified.

3. The combination of a brake-spindle having a circular collar fast thereon near its upper end and a short clutch portion immediately above the same, and a handle having its lower end axially bored and concentrically recessed, and provided with a bored and recessed bushing, and a clutch-roller within it, below which the lower edge of the handle-casting encircles said collar to exclude dust, substantially as hereinbefore specified.

4. The combination of a brake-spindle of iron or steel having its upper end lathe-finished and hardened, a recessed handle, which may be of brass, provided internally with a bushing of hardened steel, which encircles a cylindrical portion of said upper end of the spindle, and a clutch-roller within the bushing, substantially as hereinbefore specified.

JOHN W. FOWLER.

Witnesses:
H. A. LAMB,
JAS. L. ERVIN.